Patented Mar. 29, 1927.

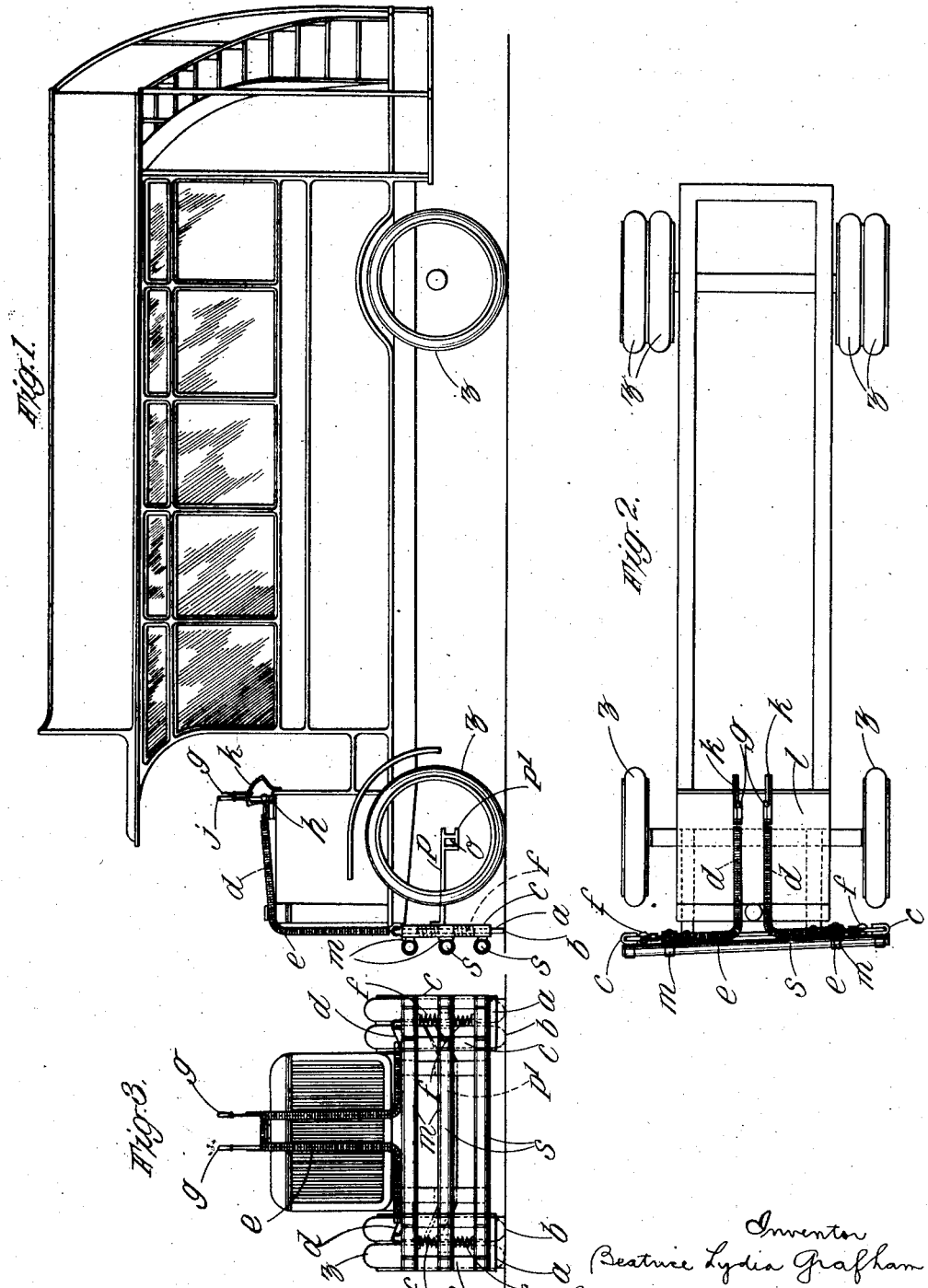

1,622,868

UNITED STATES PATENT OFFICE.

BEATRICE LYDIA GRAFHAM, OF CATFORD, ENGLAND.

LIFEGUARD OR OBSTRUCTION REMOVER FOR MOTOR PROPELLED AND SIMILAR VEHICLES.

Application filed December 16, 1925, Serial No. 75,677, and in Great Britain October 15, 1925.

This invention has reference to lifeguards or obstruction removers for motor propelled and similar vehicles and in particular to guards for use on motor omnibuses, cars and lorries.

The guards at present provided on vehicles of the kind referred to are generally adapted to prevent persons from falling between the front and rear wheels, while as regards the front of the vehicle this is not generally fitted with any means for preventing the same passing over a person falling in front thereof. Even with a front guard no protection is afforded to the front wheels but only to the space between the same.

According to this invention, the guard is disposed across the track of the front or rear wheels or both and therefore prevents the wheels of the vehicle passing over any person who should be unfortunate enough to fall in front of the vehicle, the guard serving to push or impel the person forward instead of passing over him. In connection with such guard there may be employed a frame or transverse element or elements extending across the space between the front wheels. The guard for the track of the wheels may comprise members adjustable to and from the road surface. Such members may be so suspended as to be capable of following the varying inequalities of the road surface. Each front wheels may thus be provided with a member which may extend across the track to be passed over by the rear wheels and may comprise a series of plates or the equivalent thereof capable of moving relatively to each other for continually contacting with the whole of the road surface over which the members pass. The lower edges of the members or plates may be provided with attachments of flexible material, such as rubber, or such members or plates may be fitted with rollers on their lower edges. The members may be adjustable to enable them to be moved into and out of contact with the surface of the road, although it is to be understood that in either position they serve as guards for the said wheels. In thus constructing the guard, it not only serves to prevent persons being run over by the wheels of the vehicle under all conditions, but it is also capable of being used when the members or plates are lowered into contact with the road surface, to prevent the splashing of mud and water in wet weather to each side of the vehicle by the wheels whereof, the members or plates operating as squeegees or similar thereto for displacing the mud and water to the sides of the tracks of the wheels. Further the members or plates in the lowered position also serve to minimize or overcome side-slipping and skidding of the vehicle in wet weather, in that they remove or displace moisture from the road surface and in so doing provide a comparatively dry track for the wheels. In connection with this last feature of the present invention, it will be apparent that where a number of vehicles fitted with guards as hereinbefore described pass over a smooth hard road surface, such as that provided on main roads and highways, the surface will be maintained in a comparatively clean condition without any appreciable moisture thereon. The members or plates may be so mounted as to be capable of slight or limited rearward movement when subject to considerable resistance, such as would arise where they engage with an upstanding ridge or fixed obstruction in the road. The guard is preferably so constructed as to be attachable as one piece to the front axle bar of the vehicle in order that it may not be subject to the varying vertical movements of the vehicle body relatively to the wheel axles. If desired, the front of the guard may be provided with pneumatic or other cushioning devices or pads for minimizing the shock of impact of any person with the guard when the vehicle is in motion.

In order that the said invention may be clearly understood the same will now be fully described with reference to the accompanying drawings, in which:—

Figure 1 is a side elevation of a motor propelled vehicle provided with a lifeguard or obstruction remover according to this invention.

Figure 2 is a plan of the chassis of the vehicle illustrated in Figure 1.

Figure 3 is a front elevation of the chassis shown in Figure 2.

In the guard shown in the drawings, the wheel track guard members $a$ are in the form of flat plates and are provided at their lower edges with strips of rubber or other suitable material $b$ capable of contacting with the road surface when the plates are in the lowered position and of acting as squeegees for the removal of moisture from the road surface in advance of the road wheels $z$ of the vehicle and thereby form a comparatively dry and clean track for the wheels. The members $a$ are disposed with their side margins in channelled guides $c$ forming parts of the guard and are capable of being raised and lowered through the medium of flexible attachments, such as wires $d$ extending through flexible coiled wire casings $e$ and by springs $f$, the latter serving to move the members downwardly and the former or flexible attachments as means whereby the members can be operated by hand levers $g$ for moving the members in opposition to the springs $f$ and raising the members $a$. The hand levers $g$ are pivotally mounted on pins $h$ and provided with spring controlled locking members $j$ adapted to engage with curved racks $k$ for securing the hand levers $g$ in positions respectively corresponding with the raised or lowered positions of the members $a$. The curved racks $k$ and pins $h$ on which the hand levers $g$ are pivotally mounted may be disposed on the bonnet $l$ of the vehicle, or in any other suitable position. By the employment of the wires $d$ extending through the flexible casings $e$, the members $a$ are adapted to be controlled from any suitable part of the vehicle while the flexible attachments thus constituted may be disposed or curved in different directions without detracting from the efficient operation thereof. The guard of which the channelled guides $c$ form parts, comprises horizontal bars $m$ connecting the channelled guides $c$ together and rods $n$ which extend between the guides $c$ constituting each pair and serve as abutments for the springs $f$. The guard serves as a support for the members $a$ and is adapted to be secured to the front axle $o$ of the vehicle by plates $p$ having end portions $p'$ passing round the axle $o$ and locking plates adjustably attached to a transverse bar extending between the plates $p$. The guard as a whole is obliquely disposed relatively to the front of the vehicle in order to cause any mud or other matter collected together by the members $a$ to move towards the side of the road away from the front of the members $a$ instead of becoming heaped in front thereof. The same effect is obtainable by obliquely disposing the members with their outer edges to the rear of the inner edges. On the front of the horizontal bars $m$ are disposed pneumatic cushioning devices $s$ for lessening the shock of impact in the event of a person being struck by the guard during the movement of the vehicle.

Although only one construction of the invention is hereinbefore described with reference to the accompanying drawings, it will be understood that many changes may be made in the construction and arrangement of the several parts without departing from the nature of the invention of providing members $a$ disposed across the track to be passed over by the front or rear wheels or both of a vehicle and adapted to be moved into and out of contact with the road surface and relatively to a support on which they are carried.

What I claim and desire to secure by Letters Patent of the United States is:—

1. In a guard for a vehicle, vertically movable members capable of being disposed across the track to be passed over by the wheels of the vehicle and provided at their lower edges with attachments adapted to serve as squeegees when in contact with the surface of the road, the members being pressed into contact with the road surface by springs, and means for moving the members away from the road surface in opposition to the springs, for the purpose specified.

2. In a guard for a vehicle, a transverse frame capable of attachment to the front of the vehicle and of extending across the space between the wheels on each side of the vehicle, vertically movable members arranged at each end of the frame and capable of extending across the track to be passed over by the vehicle wheels, the members being provided at their lower edges with flexible attachments capable of acting as squeegees when in contact with the surface of the road, spring means for moving the members into contact with the road surface, and hand operated means for moving the members in opposition to the spring means.

3. In a guard for a vehicle, a transverse frame provided with guides at each end and capable of attachment to the front of the vehicle and of extending across the space between the wheels on each side of the vehicle, vertically disposed members movable in the said guides and arranged at each end of the frame and capable of extending across the track to be passed over by the vehicle wheels, the members being provided at their lower edges with flexible attachments capable of acting as squeegees when in contact with the surface of the road, spring means for moving the members into contact with the road surface, and operated means for moving the members in opposition to the spring means.

4. In a guard for a vehicle, a transverse frame capable of attachment to the front of the vehicle and fitted with spring controlled vertically movable members having flexible strips on their lower edges and capable of extending across the track to be passed over by the wheels of the vehicle and of being resiliently held in contact with the surface of the road, for the purpose specified.

5. In a guard for a vehicle, a support, members movably mounted relatively to the support, spring means for moving the members into contact with the road surface, means for moving them out of contact with the road surface, and cushioning devices attached to the support, and means for adjustably mounting the guard on the front axle of the vehicle for the purposes specified.

6. In a guard for a vehicle, a vehicle axis, a support, members movably mounted on the support, means for mounting the support on the axle with the members obliquely disposed in relation thereto, spring means for moving the members into and holding them resiliently in contact with the road surface, and means for moving the members out of contact with the road surface.

7. In a guard for a vehicle, a vehicle axle, road wheels for the vehicle, a support attached to the axle, members movably mounted on the support in advance of the road wheels, and hand operated means for raising and spring means for lowering the members relatively to the support and to the road surface to be passed over by the wheels, for the purpose specified.

8. A guard for a vehicle, comprising a supporting frame provided with guides, plates movably mounted on the frame in engagement with the guides, flexible strips attached to the plates for engagement with a road surface, springs tending to move the plates towards the road surface and means for moving and holding the plates away from the road surface, for the purpose specified.

BEATRICE LYDIA GRAFHAM.